Feb. 24, 1970  J. COCKER III  3,497,156
ADAPTOR AND BEAM ASSEMBLY
Filed Feb. 16, 1968

INVENTOR.
John Cocker III
BY
Paul & Paul
ATTORNEYS.

United States Patent Office 3,497,156
Patented Feb. 24, 1970

3,497,156
ADAPTOR AND BEAM ASSEMBLY
John Cocker III, Box 223, Clover, S.C. 29710
Filed Feb. 16, 1968, Ser. No. 706,097
Int. Cl. B65h 75/18
U.S. Cl. 242—118.4                                                7 Claims

ABSTRACT OF THE DISCLOSURE

A warp beam is provided, comprising a barrel having end flange portions, with the beam ends being especially configured and recessed to receive supporting adaptors, the adaptors being constructed for various driving arrangements, but being interchangeable with any beam having its ends so configured.

BACKGROUND OF THE INVENTION

In beam and adaptor assemblies of prior art types, it has been conventional to utilize beams, e.g. those of the tricot or section type, wherein the beams have variously configured ends, such configurations often requiring the use of special adaptors, which generally accompany each particular beam, due to the lack of standardization in the industry.

Furthermore, because it has often been required that a particular set of adaptors accompany each beam, such adaptors have often been transported with the beams, thereby increasing the shipping weight of the beam, and generally increasing operational cost.

Also because of such lack of beam standardization, particular beams are often usable only with corresponding driving mechanisms. For plants having beamers which incorporate various different types of driving mechanisms, it has therefore often been necessary to store an excessive number of beams which are particularly adapted, each for a particular type of driving mechanism.

For those beams which have journals protruding from ends thereof, such as section beams, the requirement for specific adaptors for such beams often results in the shipping of adaptors with beams, with the resultant effect that protruding journals often require "tru-ing up" or alignment correction, in order to prevent beams from running under misaligned conditions in wrapers, such "tru-ing up" operations being substantially expensive.

SUMMARY OF THE INVENTION

The present invention seeks to overcome the above-mentioned and other difficulties of prior art beams, adaptors, and beam and adaptor assemblies, in providing beams which are interchangeable with various types of adaptors, the adaptors being especially configured for different types of driving arrangements but having standardized portions for connection of the adaptors to standardized beams.

The adaptors of this invention are also designed to reduce the shipping weight of beams, by occupying substantial portions of the mass of the assembled beam and adaptors, in addition to providing beam support. A particular tapered configuration is utilized for the ends of the adaptors which are inserted into the beams, which tapered configuration may be threaded.

Accordingly, it is a primary object of this invention to provide a beam which is adapted for use with various types of knitting machines, warpers, or the like, and which is of standardized construction, for facilitating attachment thereto of various adaptors, having any desired driving arrangement.

It is another object of this invention to provide individual beams and adaptors, wherein each adaptor has a flange which is received into a recess of a beam flange, and which is connected thereto by screws or the like, each adaptor also having a protruding portion which projects into and against the barrel of a beam for supporting the same, wherein the mating surface of each adaptor projecting portion and barrel may be substantially tapered, and may be threaded as well.

It is a further object of this invention to provide adaptors which are especially configured for ease of entry and support of beams, and which have a common beam-connection portion, with variously configured means for driving the adaptors, at opposite ends thereof.

It is another object of this invention to accomplish the object recited immediately above, wherein each adaptor is of tapered construction.

It is a further object of this invention to provide a novel beam and adaptor combination, wherein adaptors having various driving arrangements thereon are interchangeable with beams, due to the particular constructions of each of the beams and adaptors and attachment of adaptors to the beams.

Other objects and advantages of this invention will be readily apparent to one skilled in the art, upon a study of the following brief figure descriptions, detailed description of the preferred embodiments, and the appended claims.

DESCRIPTION OF THE PREFERRED EMBODIMENTS

Figure 1:
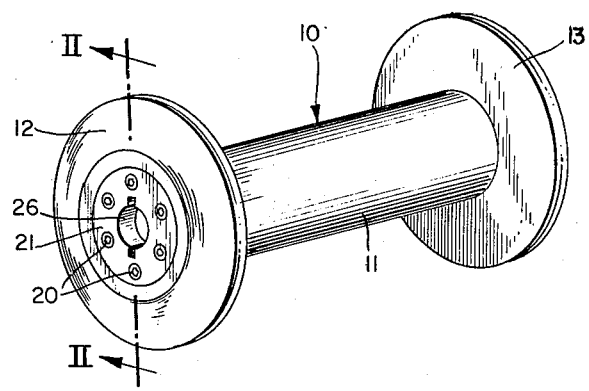
FIGURE 1 is a top perspective view of a beam of this invention, embodying an adaptor of this invention.

Although specific forms of the invention have been selected for illustration in the drawings, and the following description is drawn in specific terms for the purpose of describing these forms of the invention, this description not being intended to limit the scope of the invention.

It is first to be noted that beams of the type described herein are to be distinguished from small textile carrying devices such as pirns, bobbins and spools, because the tremendous quantities of yarn that build up on beams are placed there in the form of a plurality of closely spaced yarn ends which are arranged in the form of a sheet or warp, to carry, for example, often as much as from 5,000 to 30,000 cubic inches of yarn. Clearly, such beams are of substantial size, and are not to be confused with small bobbins and spools which need not be manufactured to be structurally strong and rigid, because of their small size and their rather minimal requirements with regard to weight-carrying capacity. In fact, such small spools and bobbins often utilize adaptors which retain the spool end flanges in position on the spool cylinder, structural features which are not possible with beams of the type of the instant invention, wherein tremendous pressures are exerted longitudinally of the beam barrel portion, in the direction of the beam end flange portions.

Referring now to the drawings in detail, reference is first made to FIGURE 1, wherein there is illustrated a beam, generally designated by the numeral 10 comprising a barrel portion 11 and opposite end flanges portions 12 and 13.

The barrel portion 11 of the beam 10 is generally of hollow right circular cylindrical construction, having an inner bore 14. Each flange portion 12, 13 is of circular construction, and is integral with or otherwise rigidly secured to the barrel portion 11.

A circular recess 15 is provided in the outer end of each of the flange portions 12, 13 and terminates in an annular planar surface 16. A tapered bore 17 is provided, extending axially inwardly from the planar surface 16, and intersects the bore 14 of the barrel portion 11. The annular tapered surface 17 increases linearly from a large diameter adjacent the surface 16 to a smaller diameter at its junction with the bore 14. A plurality of tapered holes 18, are provided, circumferentially spaced about the planar surface 16, for receiving connection members 20 therein.

An adaptor 21 is provided, received within each end of the beam 10, the adaptor 21 having a radially outwardly extending flange 22 and an axially projecting beam-supporting portion 23. A plurality of equidistantly circumferentially spaced counterbored holes 24 are provided in the flange 22, for receiving the cap headed screws 20 or like connection members therein, in recessed relation.

Figure 2:
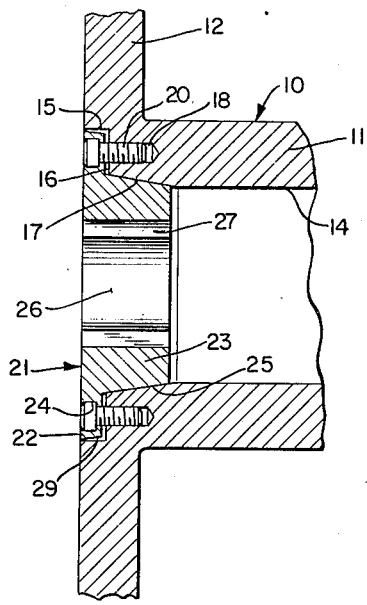
FIGURE 2 is an enlarged fragmentary longitudinal sectional view of one end of a beam and adaptor assembly of this invention, taken generally along the line II—II of FIGURE 1, and wherein the particular construction and connection of the beam and adaptor is clearly illustrated.

The adaptor 21 has a frusto-conically tapered outer surface 25 on the projecting portion 23, for mating engagement with the similarly tapered surface 17 of the beam 10. The tapered surfaces 25 and 17 may be smooth, as illustrated in FIGURE 2, for wedging engagement of the adaptor 21 within the end of the beam 10, or threaded, as desired for additional fastening engagement of the adaptor 21 to the beam 10.

A bore 26 is provided in the adaptor 21, having two or more keyways 27 communicating therewith, such keyways being selected in number and size depending upon the arbor which is to be inserted within the bore 26, and the particular driving mechanism to be used; i.e., a single dog system, a three dog system, etc. The bore 26 can accept the standard arbor generally used in knitting machinery to carry the beams over the knitting machine, as well as the driving spindle of a warper, e.g. for tricot purposes.

The adaptor 21 has an outer peripheral flange surface 29 for facilitating entry of the flange 22 into the recess 15.

It will be apparent, that the beam 10 is carried at each end by an adaptor 21, the weight of the beam 10 being transmitted through the end of the barrel portion 11, to the protruding portion 23 of the adaptor 21, whereas rotation is transmitted from the adaptor 21 to the beam 10, through the adaptor flange 22, the connecting screws 20, and the tapped holes 18 of the beam 10.

Figure 3:
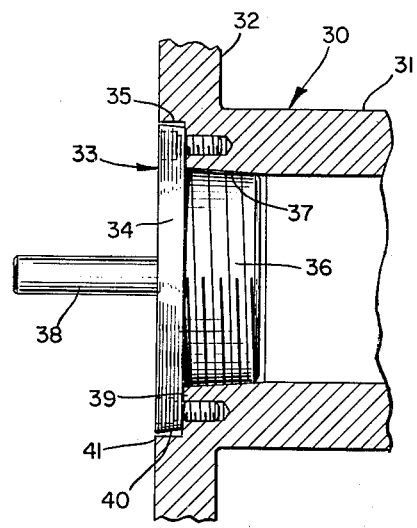
FIGURE 3 is an enlarged fragmentary longitudinal sectional view of a beam and adaptor assembly of this invention, generally similar to that of FIGURE 2 but wherein the adaptor is of the type having a protruding journal.

In FIGURE 3, there is illustrated an alternative embodiment of this invention, wherein a beam 30 having a barrel portion 31 and a flange portion 32 has an adaptor 33 received within an end thereof, the adaptor 33 having a flange 34 received within a recess 35 of the flange portion 32 of the beam 30, and a projecting portion 36 which is tapered and threaded, and in load-carrying engagement with a corresponding tapered and threaded surface 37 inwardly of the barrel portion 31 of the beam 30. The embodiment of FIGURE 3 is generally similar to that of FIGURE 2, as is its operation, but the adaptor 33 of FIGURE 3 is provided with a journal 38, projecting from the flange 34, in an opposite direction to the projection of the tapered projecting portion 36. Such a projection 38 is generally standard on section beams, as opposed to tricot beams.

The adaptor 33, like the adaptor 21, also has a frusto-conically tapered outer periphery 40 of its flange 34, to facilitate entry of the flange portion 34 into the recess 35, and to prevent the flange 34 from abutment against the outer lip 41 of the flange portion 32 of the beam 30, as the tapered portion of the adaptor and beam are brought into engagement.

In the embodiment of FIGURE 3, the tapered engaging surfaces of the projecting portion 36 of the adaptor and its mating surface of the beam 30 may be threaded, as shown, and tightened such that the flange 34 of the adaptor 33 abuts against the planar surface 39 of the beam 30, as shown. Should the projecting portion 36 of the adaptor 33 not be threaded, there may be a slight relief between the flange 34 of the adaptor 33 and the planar surface 39 of the beam 30, similar to that illustrated in FIGURE 2.

As has been set forth above, this invention is directed to large, heavy beams, such as those of the tricot or section type, and is directed toward beam standardization, and a reduction in shipping weight. It will be noted in this regard, that the adaptors occupy substantial portions of the mass at each end of the beam, such that, when removed for shipment of the beam, a substantial reduction in beam shipment weight may be effected, thus saving shipping cost.

An additional advantage is provided by the instant invention. Generally, because of the substantial size of beams, and their consequent substantial weight, such can be cumbersome and create problems with the insertion of adaptors and the centering of adaptors, prior to beam use. It will be noted that the particular tapered construction of the inwardly projecting portions of the adaptors, and the mating tapered construction of beam-receiving bores facilities the entry of both the threaded and unthreaded adaptors, such feature also assuring geometric centering of the beams on the adaptors, and precluding "play" or backlash after assembly.

When adaptors are used for driving systems which require projecting journals such as that 38 illustrated in FIGURE 3, such projecting journals often become marred or damaged, or become misaligned during shipment of the beams, when the beams are shipped with their adaptors. By constructing beams according to the present invention, to be of standardized configuration, and precluding the necessity of each beam having special adaptors, when adaptors which have projecting journal portions are utilized, the journal portions need not be periodically subjected to a "tru-ing" or aligning operation, as has often been necessitated for prior art types of adaptors.

While this invention has been disclosed with reference to selected specific forms, it will be appreciated that changes in variations may be made within the structure and use of this invention, without departing from the spirit and scope of the invention. For example, equivalents may be substituted for elements shown and described, and certain features may be used independently of other features, without departing from the scope of the invention.

It will further be understood that the "Abstract of the Disclosure" set forth herein is intended to provide a non-legal technical statement of the contents of the disclosure in compliance with the Rules of Practice of the United States Patent Office, it is not intended to limit the scope of the invention described.

What is claimed is:

1. A warp beam for use in transporting great quantities of textile material without support from an adaptor comprising a barrel portion and flange portions disposed in rigid relation to said barrel portion at ends thereof independently of an adaptor, at least one said flange portion having a recess means in an end thereof for receiving an adaptor flange, said beam including means for receiving at least one adaptor flange connection means therein, and said barrel portion having interior surface means in at least one end thereof for engagement and support of said beam by an adaptor independently of any securement of said flange portion thereto, including in the combination an adaptor having a cylindrical projecting portion having surface means thereon for supporting engagement against said inner surface means of said beam barrel portion, and flange means for reception within said beam flange portion recess means; said flange means having connection means thereon for facilitating driving engagement of said beam from said adaptor, wherein said adaptor surface means is frusto-conically tapered toward a lesser diameter at a free end of said projecting portion.

2. The adaptor defined in claim 1, wherein said tapered surface means is threaded.

3. The adaptor defined in claim 1, wherein said adaptor has a central bore therein, and means associated with said bore for facilitating driving of said adaptor from a member insertable into said bore.

4. The adaptor defined in claim 1, including a centrally disposed shaft extending from said flange portion, in a direction opposite to said projecting portion.
threaded engagement.

5. The combination of an adaptor and warp beam, wherein said beam includes a barrel portion and a flange portion rigidly disposed at least one end thereof, by means independent of said adaptor, said adaptor being disposed at said end of said barrel portion and including means projecting inwardly of said barrel portion for engaging and supporting said barrel portion, and flange means constructed to said beam flange portion for transmitting rotational drive to said beam, wherein said barrel portion and said projecting portion are matingly frusto-conical tapered toward a lesser diameter at an innermost portion of said barrel, wherein said adaptor flange means is received within said beam flange portion in recessed relation and attached therein by at least one connection member.

6. The combination defined in claim 5, wherein said barrel portion and said projecting portion have surfaces in wedging engagement.

7. A combination defined in claim 5, wherein said barrel portion and said projecting portion have surfaces in threaded engagement.

References Cited

UNITED STATES PATENTS

| 1,856,298 | 5/1932 | Trauer | 242—118.6 |
| 1,857,599 | 5/1932 | Mack | 242—118.61 |
| 1,869,408 | 8/1932 | Bungay | 242—118.4 |
| 2,344,132 | 5/1944 | Coxe | 242—118.8 |
| 2,453,247 | 11/1948 | Moss | 242—118.62 |
| 2,651,478 | 9/1953 | Harris et al. | 242—118.6 |
| 2,957,642 | 10/1960 | Benoit | 242—118.61 |
| 3,099,417 | 7/1963 | Portal | 242—118.62 |

FOREIGN PATENTS

| 690,784 | 6/1930 | France. |
| 730,542 | 5/1955 | Great Britain. |
| 1,022,513 | 3/1966 | Great Britain. |

GEORGE F. MAUTZ, Primary Examiner

U.S. Cl. X.R.

242—118.62

PO-1050
(5/69)

UNITED STATES PATENT OFFICE
CERTIFICATE OF CORRECTION

Patent No. 3,497,156     Dated February 24, 1970

Inventor(s) JOHN COCKER, III

It is certified that error appears in the above-identified patent and that said Letters Patent are hereby corrected as shown below:

Column 1, line 45 "wrapers" should read --warpers--.

Column 4 line 30 "facilities" should read --facilitates--.

Column 5 line 16 delete "threaded engagement".

Column 5 lines 23-24 "constructed" should read --connected--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents